United States Patent
Vijayaraj et al.

(10) Patent No.: US 10,633,609 B2
(45) Date of Patent: Apr. 28, 2020

(54) PROCESS FOR IN-SITU SYNTHESIS OF DISPERSION ZNO—TIO2 NANOPARTICLES IN OIL

(71) Applicant: Indian Oil Corporation Limited, Mumbai (IN)

(72) Inventors: Munusamy Vijayaraj, Faridabad (IN); Samik Kumar Hait, Faridabad (IN); Madhira Indu Sekhara Sastry, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 112 days.

(21) Appl. No.: 15/980,900

(22) Filed: May 16, 2018

(65) Prior Publication Data

US 2018/0334634 A1  Nov. 22, 2018

(30) Foreign Application Priority Data

May 16, 2017  (IN) .............................. 201721017139

(51) Int. Cl.

| | | |
|---|---|---|
| *C10M 125/10* | (2006.01) | |
| *C10M 177/00* | (2006.01) | |
| *B82Y 99/00* | (2011.01) | |
| *B82Y 40/00* | (2011.01) | |
| *B82Y 30/00* | (2011.01) | |

(52) U.S. Cl.
CPC ........ *C10M 125/10* (2013.01); *C10M 177/00* (2013.01); *B82Y 30/00* (2013.01); *B82Y 40/00* (2013.01); *B82Y 99/00* (2013.01); *C10M 2201/062* (2013.01); *C10N 2220/082* (2013.01); *C10N 2230/06* (2013.01); *C10N 2250/12* (2013.01)

(58) Field of Classification Search
CPC .............. C10M 125/10; C10M 177/00; C10M 2201/062; C10N 2230/06; C10N 2220/082; C10N 2250/12; B82Y 30/00; B82Y 40/00; B82Y 99/00
See application file for complete search history.

(56) References Cited

U.S. PATENT DOCUMENTS

| | | | | |
|---|---|---|---|---|
| 8,008,237 | B2 * | 8/2011 | Mathur | ................ C01G 23/047 508/165 |
| 2015/0367327 | A1 * | 12/2015 | Shaw | ..................... B01J 35/023 502/343 |
| 2016/0237373 | A1 | 8/2016 | Vijayaraj et al. | |

FOREIGN PATENT DOCUMENTS

| | | |
|---|---|---|
| CN | 104194867 | 12/2014 |
| CN | 104194867 A  * | 12/2014 |
| WO | 2014/033634 | 3/2014 |

* cited by examiner

*Primary Examiner* — Taiwo Oladapo
(74) *Attorney, Agent, or Firm* — Melissa M. Hayworth; E. Joseph Gess

(57) ABSTRACT

The present invention provides a process for in situ synthesis of dispersion of ZnO and $TiO_2$ nanoparticles in an oil medium, wherein the process comprises: (a) providing layered basic zinc hydroxide (LBZ) in an oil medium, containing a dispersant, (b) providing a titanium precursor in the oil medium to obtain a mixture, (c) hydrolyzing the mixture to obtain a suspension, and (d) decomposing the suspension to obtain a dispersion of mixture of ZnO and $TiO_2$ nanoparticles. The present invention also provides an oil dispersion comprising dispersant stabilized mixture of zinc oxide and titanium dioxide nanoparticles were synthesized through this process. The dispersion contains up to 2.5 Wt % metals loading balanced with dispersant and base oil or dispersant alone. Addition of this dispersion to oil of lubricating viscosity improves the anti-wear property and resulting a low SAPS formulation.

18 Claims, No Drawings

PROCESS FOR IN-SITU SYNTHESIS OF DISPERSION ZNO—TIO2 NANOPARTICLES IN OIL

RELATED APPLICATION

This application is a continuation of Indian Patent Application No. 201721017139, filed May 16, 2017, which is incorporated by reference in its entirety.

FIELD OF THE INVENTION

The present invention relates to an oil dispersion comprising dispersant stabilized mixture of zinc oxide and titanium dioxide nanoparticles which are synthesized through a chemical method. Particularly, the invention relates to a process for in-situ synthesis of dispersion of ZnO and $TiO_2$ nanoparticles in oil medium. Additionally, the present invention relates to a lubricant oil composition, wherein the composition comprises a base oil, a dispersant and the dispersion of ZnO and $TiO_2$ as obtained by the process of the present invention.

BACKGROUND OF THE INVENTION

The anti-wear (AW) and extreme pressure (EP) additives are mainly used for reducing friction and wear under boundary lubrication conditions. These additives are vital constituents of most lubricant formulations, under conditions of medium to high or extreme pressure, react with mating metal surfaces forming protective tribo-chemical layers. Thus the equipments are protected from wear and enabled to operate successfully under heavy loads. Generally, any chemical constituent, pure or impure, intended or not, that is formed or deposited during lubrication on the metal surface, and able to separate and prevent the opposing surfaces from direct contact could theoretically be construed as AW/EP agent. Therefore, the classic AW/EP additives are oil-soluble chemicals or components which react with the metal surface forming a film that withstands both compression and to a degree, shear. Since reaction with the metal is of the essence, only elements that can form iron compounds are truly eligible for this task. That makes compounds of sulfur, phosphorus, chlorine (or other halogens) preferential choices. Traditionally, wear protection and friction modification by engine oil is provided by zinc dithiophosphate (ZDDP), molybdenum dithiophosphate (MoDDP) or other phosphorus compounds. These additives provide effective wear protection and friction control on engine parts through formation of a glassy polyphosphates anti-wear film. However, these additives may have one or more disadvantages such as;
1. Copper and/or lead corrosion,
2. Color darkening of the finished lubricant,
3. Increased levels of sulfur and phosphorus in the finished lubricant, etc.

Among these disadvantages the level of phosphorus and sulfur in the engine oil is the most serious concern. This is because the deposition of phosphorus and sulfur species on automotive three way catalytic converters from lubricants has been known for some time to have a detrimental effect on poisoning the catalysts. Future generations of passenger car motor oils and heavy duty diesel engine oils require lower levels of phosphorus and sulfur in the finished oil in order to protect the pollution control devices. Hence the limits of phosphorus and sulfur levels in engine oil are reduced and supplemental forms of AW additives will be required to replace ZDDP. For example, current GF-4 motor oil specifications require a finished oil to contain less than 0.08 and 0.7 wt % phosphorus and sulfur, respectively and PC-10 motor oil specifications, the next generation heavy duty diesel engine oil, requires to contain less than 0.12 and 0.4 wt % phosphorus and sulfur, respectively. Certain molybdenum and organo zinc additives known in the industry contain phosphorus and sulfur at levels which reduce the effectiveness of pollution control devices.

Much work has gone in to reducing the level of ZDDP in lubricants by increasing the use of known friction modifiers, other phosphorus free components or balancing the properties of many compounds but this is difficult because ZDDP is not a mono-functional additive that provides only AW chemistry but has multifunctional properties providing anti-scuffing and anti-oxidation, all in one additive component. In addition it has complex interactions with other additives. Another approach is to modify the ZDDP molecule to have the same activity at lower concentrations by changing the alkyl group but a stable anti-wear ZDDP film cannot be formed by the modified ZDDP at low concentrations.

Nevertheless, the ability to formulate with ashless dispersants would also benefit from the replacement of ZDDP chemistry. Ashless dispersants deteriorate the anti-wear performance of ZDDP because the amount of ZDDP adsorbed onto the metal surfaces is decreased by formation of complexes with ashless dispersants in oil. Therefore, lubricant additives and/or composition that delivers spectacular anti-friction and wear properties and as well as compatible with pollution control devices used for automotive and diesel engines are highly demanded. One such lubricant additives and/or compositions compatible with pollution control devices should also not adversely affect oil solubility, corrosion and darkening the color of the finished lubricant. With rapid development of nanoscience and technology, nanoparticles have received considerable attention in recent years because of their special physical and chemical properties.

US20160237373A1 discloses a process for synthesizing dispersion of ZnO nanoparticles in-situ in an oil medium in presence of a dispersant.

U.S. Pat. No. 8,008,237A discloses a process to prepare a titanium-containing lubricant additive by reaction of titanium alkoxide with added water in presence of a dispersant.

CN 104194867 discloses a method to prepare nano titania and nano zinc oxide powder separately and disperse the powder mix in lubricating oil composition by aid of p-toluene sulfonic acid, which is not only acidic but also contains S. Additional acidity and S content although not desired from lubricant standpoint and emission parameters. In recent years, studies have shown that nano additized lubricant can reduce the friction coefficient and wear significantly and also heal the damaged parts of the metal surface. Although nano-$TiO_2$/nano-ZnO passivated with oleic/p-toluene sulfonic acid had claimed to enhance its stability, and reducing friction, the formulation is tend to increase the total acid number (TAN) of the engine lubricant and in long run generate more soot, increase corrosive wear and reduce oil life.

Especially in the field of tribology, many kinds of inorganic nanoparticles have been successfully used in lubricating oils and greases to solve wear and friction problems. The dispersion of inorganic nanoparticles in lubricating oil is still a principal problem for application of nanomaterial additives. In order to obtain better dispersion, a surface modification technique is usually adopted to structure an organic layer on the surface of nanoparticles. As compared with the conventional additives either containing heavy metals like Zn, Mo and Pb etc., or too much sulfur and phosphorus, green nanomaterial additives with environmentally benign characteristics are strongly required.

Objective of the Invention

It is the primary objective of the invention is to provide oil soluble mixed metal-oxide nanoparticles dispersion using Sulfur and Phosphorus free dispersant.

It is the further objection of the invention is to provide a step-wise process for the aforesaid oil soluble mixed metal-oxide nanoparticles dispersion without adding water from outside; thus removing one ingredient one process from the synthesis route.

SUMMARY OF THE INVENTION

Accordingly, the present invention relates to an oil soluble mixed metal-oxide nanoparticles dispersion and uses it as an additive in engine oil or lubricating composition thereof. The added additive has enhanced anti-wear performance of engine oil or lubricating composition. Metal oxide nanoparticles are synthesized through several methodologies; pre-cipitation, sol-gel, combustion, laser ablation routes, microwave heating, chemical or physical vapor deposition and ball milling approach.

According to the main embodiment, the present invention relates to a process for in situ synthesis of dispersion of mixture of ZnO and $TiO_2$ nanoparticles in an oil medium, wherein the process comprises:

(a) providing layered basic zinc hydroxide (LBZ) in an oil medium, containing a dispersant, (b) providing a titanium precursor in the said oil medium to obtain a mixture, (c) hydrolyzing the mixture to obtain a suspension, and (d) decomposing the suspension containing LBZ and titanium hydrous oxide under vacuum to obtain an oil dispersion of mixture of ZnO and $TiO_2$ nanoparticles.

In preferred embodiment, the aforesaid LBZ is obtained by dissolving a Zinc salt in an alcoholic solvent and heating to 90° C. in an autoclave or refluxing in a glass reactor for certain time period to obtain a white suspension, centrifuging and washing twice with deionized water to precipitate LBZ.

In preferred embodiment, the hydrolysis of mixture comprises refluxing the mixture of step (b) to hydrolyze titanium precursor to obtain a colloidal suspension containing titanium hydrous oxide in oil containing LBZ and dispersant.

In preferred embodiment, the decomposition as said in step (d) comprises heating to about 140° C. to obtain a dispersion of mixture of ZnO and $TiO_2$ nanoparticles, along with dispersant and residual anions.

According to the other embodiment, the present invention covers the process for in situ synthesis of dispersion of ZnO—$TiO_2$ nanoparticles, stabilized in hydrocarbon medium (oil soluble dispersible mixed metal-oxide nanoparticles dispersion) comprising:

(a) hydrolyzing a titanium tetra alkoxides precursor by water molecules of layered base zinc (LBZ) in oil medium comprising dispersant to give a colloidal suspension comprising titanium hydrous oxide in oil containing LBZ and dispersant; and (b) evacuating the colloidal suspension of step (a) and followed by heating to 120-160° C. more preferably 120-150° C. for 45 to 90 minutes to trigger the LBZ decomposition to ZnO and $TiO_2$ formation from titanium hydrous oxides to give a clear dispersion of ZnO nanoparticles in the oil/hydrocarbon medium along with nanoparticles of $TiO_2$, dispersant and residual anions.

In the present invention, the advantage of using water molecules of layered base zinc (LBZ) for hydrolyzing a titanium tetra alkoxides precursor is that the present invention reduces one component and more importantly reducing one step.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

Definition

For the purposes of this invention, the following terms will have the meaning as specified therein:

"Nanoparticle" as used herein having the size of a particle spans in the range between 1 and 100 nm. Nanoparticles have different physical and chemical properties from bulk metals (e.g., higher specific surface areas, specific optical properties, mechanical strengths, etc.), properties that might prove attractive in various industrial applications.

"Layered basic zinc hydroxide (LBZ)" used herein is an organic-inorganic hybrid of Zinc salt. This material is a precursor for controlled synthesis of Zinc based nanoparticles.

Oil soluble organo zinc like ZDDP, Zn-DTC are known and similarly organo titanium like polytitanoxanes, alkyl titanium phosphates (Ti-DDP) are known and applied as antiwear additives. These are good antiwear additives; however, the presence of S and P in these additives would potentially hamper the performance of pollution controlling devices. In this art, Zn and Ti are stabilized in oil medium as nano metal oxide form incorporated in oil medium and tested for their influence on antiwear property in lube formulations.

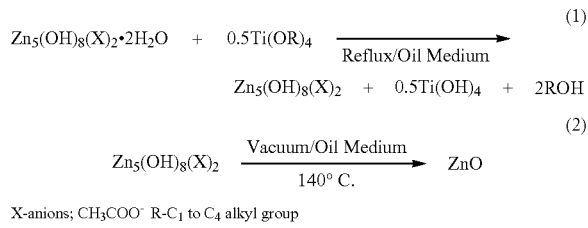

X-anions; $CH_3COO^-$ R-$C_1$ to $C_4$ alkyl group

Zinc compounds having stacked hydroxides layers held together by anions (Cl, $NO_3$, Br, I, $CH_3COO$) between the layers. It is well known that the decomposition of LBZ (structure mentioned above) yields flakes of porous nano ZnO as mentioned in reaction equation (2) [Journal of Colloid and Interface Science 272 (2004) 391-398]. In this invention, a two steps in situ approaches was followed to prepare metal oxide nanoparticles and it follow as (i) hydrolysis of titanium alkoxide precursor utilizing the water molecules of LBZ as mentioned in equation (1) and (ii) ZnO nanoparticles preparation in situ by the decomposition of layered basic zinc hydroxides (LBZ) as mentioned in equation (2) and both these steps executed within an oil medium containing stabilizing agents. The dispersants present in the oil medium stabilize the freshly formed nanoparticles oxides and thus were obtained a clear dispersion of ZnO and $TiO_2$ in oil. The residual anions evolved during decomposition were removed through vacuum stripping.

The additive is free from S and P and thus it is greener additive and could cater wherever the demand arises for low SAP formulations. The importance of low SAPS (sulfated ash, phosphorous, Sulfur) content lubricating oil has already been taught in WO 2014/033634. The ashing factor for different metal content in lubricating formulation is taken from website reference and detailed below (http://www.konnaris.com/search/calculations.htm).

| Element | Ashing Factor |
| --- | --- |
| Lithium | 7.92 |
| Magnesium | 4.95 |
| Calcium | 3.40 |
| Boron | 3.22 |
| Sodium | 3.09 |
| Potassium | 2.33 |
| Barium | 1.70 |
| Molybdenum | 1.50 |
| Zinc | 1.50 |
| Lead | 1.464 |
| Manganese | 1.291 |
| Copper | 1.252 |

It is prudent from the table that Zn has a moderate ashing factor and Titania is greener with nil contribution towards sulfated ash. ZDDP additive contains Zn along with S & P in the moiety and the contribution towards SAPS is very high. The low SAPS formulation is not only desired for better engine performance and extended oil life; it is also desired for low emission & higher fuel economy.

Accordingly, the present invention provides a process for in situ synthesis of dispersion of ZnO and $TiO_2$ nanoparticles in an oil medium, wherein the process comprises:
(a) providing layered basic zinc hydroxide (LBZ) in an oil medium, containing a dispersant,
(b) providing a titanium precursor in the oil medium to obtain a mixture,
(c) hydrolyzing the mixture to obtain a suspension, and
(d) decomposing the suspension to obtain a dispersion of mixture of ZnO and $TiO_2$ nanoparticles.

In an embodiment of the present invention, the LBZ is obtained by dissolving a Zinc salt in an alcoholic solvent and heating to 90-150° C. for a time period in the range of 40 minutes to 24 hours to obtain a white suspension, centrifuging and washing twice with deionized water to precipitate LBZ.

In one of the embodiment of the present invention, the titanium precursor is a titanium tetra alkoxide.

In another embodiment of the present invention, the hydrolysis is achieved by the water existing in the form of hydrate within LBZ.

In still another embodiment of the present invention, the hydrolysis of mixture comprises refluxing the mixture of step (b) to hydrolyze titanium precursor to obtain a colloidal suspension containing titanium hydrous oxide in oil containing LBZ and dispersant.

In still another embodiment of the present invention, the decomposition comprises heating to about 120-150° C. to obtain a dispersion of mixture of ZnO and $TiO_2$ nanoparticles, along with dispersant and residual anions.

In still another embodiment of the present invention, the heating is conducted for about 45 to 90 minutes.

In yet another embodiment of the present invention, the process for in situ synthesis of dispersion of mixture of ZnO and $TiO_2$ nanoparticles in an oil medium, further comprising decomposing and removing residual anions through vacuum stripping.

In yet another embodiment of the present invention, the in situ prepared nanoparticles of ZnO and $TiO_2$ are stabilized by dispersant in the oil medium, wherein the dispersant is ashless dispersant. The dispersant is present in the concentration range of 50-75 wt %. In one of the embodiment the dispersant is present in the concentration range of 50-65 wt %. The dispersant is oil soluble and free from phosphorus and sulfur. The dispersant is nitrogen substituted long chain alkenyl succinimide dispersant and selected from the group consisting of Polyisobutylene Succinimides (PIBSI), oil soluble fatty acid, sorbitan ester and oil soluble carboxylic acids.

In yet another embodiment of the present invention, the step (a) of the process comprises dispersing LBZ in a C1-C3 alcohol and adding to oil medium containing 40-60% of dispersant.

In one embodiment of the present invention the oil medium is base oil.

In an another embodiment of the present invention, prior to decomposing the suspension, the suspension is evacuated at room temperature and heated to 80° C.-140° C. to remove alcohol solvent.

In yet another embodiment of the present invention, providing a titanium precursor in said oil medium to obtain a mixture comprises stirring the mixture of step (a) continuously at about 200-1500 RPM and adding stoichiometric amount of titanium tetra alkoxide precursor resulting Ti content of 3% by weight.

The present invention provides a process for in situ synthesis of dispersion of ZnO—$TiO_2$ nanoparticles, stabilized in oil soluble mixed metal-oxide nanoparticles dispersion comprising:
(i) hydrolyzing the titanium tetra alkoxides precursor by the water molecules of layered basic zinc hydroxide (LBZ) in oil medium comprising dispersant to give a colloidal suspension comprising titanium hydrous oxide in oil containing LBZ and dispersant; and (ii) evacuating the colloidal suspension of step (i) and followed by heating to 120-150° C. for 45 to 90 minutes to trigger the LBZ decomposition to ZnO and $TiO_2$ formation from titanium hydrous oxides to give a clear dispersion of ZnO nanoparticles in the oil/hydrocarbon medium along with nanoparticles of $TiO_2$, dispersant and residual anions.

In another embodiment of the present invention, the nanoparticles of $TiO_2$ is prepared by the presence of 2 moles of $H_2O$ within LBZ and ZnO nanoparticles is prepared by the decomposition of LBZ within the oil medium containing stabilizing agents and nano $TiO_2$.

In one of the embodiment of the present invention, in the oil medium the nanoparticles of $TiO_2$ and ZnO are stabilized by dispersant in the concentration range in 50-75 wt. %, wherein dispersant is ashless dispersant. In yet another embodiment of the present invention, in the oil medium the nanoparticles of $TiO_2$ and ZnO are stabilized by dispersant in the concentration range in weight percent 50-65 wt. %, wherein dispersant is ashless dispersant.

In yet another embodiment of the present invention, the ashless dispersant is oil soluble compounds containing polymeric hydrocarbon structure and polar functional groups that stabilize nanoparticles.

In yet another embodiment of the present invention, the ashless dispersant is nitrogen substituted long chain alkenyl succinimides dispersant and selected from the group consisting of Polyisobutylene Succinimides (PIBSI), oil soluble fatty acid, sorbitan ester or oil soluble carboxylic acids.

In an another embodiment of the present invention, in step (i) of the process for in situ synthesis of dispersion of $ZnO$—$TiO_2$ nanoparticles the LBZ is dispersed in a C1-C3 alcohol and added to oil containing 40-60 wt. % of dispersant before adding the titanium tetra alkoxide precursor to obtain a mixture and then the mixture is refluxed and during refluxing period the moles of water molecule hydrolyze titanium tetra alkoxide to give a colloidal suspension containing titanium hydrous oxide in oil containing LBZ and dispersant.

In yet another embodiment of the present invention, the C1-C3 alcohol is selected from the group comprising of methanol, ethanol, isopropanol or combination thereof.

In yet another embodiment of the present invention, the oil is selected from the group comprising of base oil, process oil, mineral lubricating oils, solvent-treated or acid-treated mineral lubricating oils of the paraffinic, naphthenic or mixed paraffinic-naphthenic types, polyalphaolefins (PAOs) derived from monomers having from about 4 to about 30 carbon atoms having a viscosity in the range from about 1.5 to about 150 mm²/s (cSt) at 100° C., esters of dicarboxylic acids with a variety of alcohols, or a mixture thereof.

In yet another embodiment of the present invention, the titanium tetra alkoxides precursors having formula $Ti(OR)_4$, wherein R is $C_1$ to $C_4$ alkyl group and the titanium tetra alkoxide precursors is selected from a group comprising of titanium tetra isopropoxide, titanium tetrabutoxide, titanium tetra ethoxide, titanium tetra methoxide.

In yet another embodiment of the present invention, the LBZ having formula $Zn_5(OH)_8(X)_2.2H_2O$ and X is anions and selected from a group comprising of Cl, $NO_3$, Br, I, and $CH_3COO^-$.

In one of the embodiment of the present invention, the layered base zinc (LBZ) is prepared by the process comprising:

(a) dissolving a Zinc salt in an alcoholic solvent and heating to 90-120° C. for 40 minutes to 24 hours to obtain a suspension;

(b) centrifuging the suspension as obtained in step (a) and washing with deionized water to precipitate layered base zinc (LBZ) having 2 moles of water in the form of hydrate.

In yet another embodiment of the present invention, the Zinc salt is selected from the group comprising of zinc acetate dihydrate.

The present invention provides an oil dispersion comprising dispersion ZnO—$TiO_2$ nanoparticles stabilized in oil/hydrocarbon medium as obtained from the process, wherein the dispersion contains up to 2.5 wt % metals loading balanced with dispersant and base oil or dispersant alone. The oil dispersion of the present invention improves antiwear property.

The following non-limiting examples illustrate in details about the invention. However, they are, not intended to be limiting the scope of present invention in any way.

Example 1

About 100 ml of liquor solution of zinc acetate dihydrate ($Zn(CH_3COO)_2.2H_2O$) in the concentration 0.15 moles per cubic decimeter was charged in a round bottom flask fitted with a reflux condenser and heated at 140° C. for 24 h to give white precipitate. The precipitate was filtered and washed twice with deionized water to give fine white product layered basic zinc acetate (LBZA) of formula $Zn_5(OH)_8(CH_3COO)_2.2H_2O$. The product was redispersed in isopropyl alcohol (25 ml) for further use/characterization.

Example 2

To a 500 ml two neck round bottom flask containing 60 g polyisobutylene succinimides (PIBSI) dispersant and 16 g group II lubricating base oil added the iso propanol suspension prepared from the example 1 (LBZA) and then stoichiometric amount of titanium tetra isopropoxide (2.13 g) was added and heated to reflux for 90 minutes to give a colloidal suspension. The suspension was transferred to rotavapor flask and iso propanol was stripped under vacuum at 90° C. and then heated further to 140° C. under vacuum to remove decomposing acetates to give clear stable product containing 0.46% Ti and 1.45 Wt % of Zn (metal content) and confirmed by ICP-AES (Inductively coupled plasma-atomic emission spectrometry) analysis. The product could readily be mixed in any mineral oil (Group I/II/IV) of lubricating viscosity.

Example 3

To a 750 ml high pressure reactor (Premex) added 300 ml isopropanol solution containing zinc acetate dihydrate (Zn $(CH_3COO)_2.2H_2O$) in the concentration 0.05 moles per cubic decimeter and heated at 95° C. for 24 h to give highly viscous colloidal white precipitate. The product was washed thoroughly by centrifuge with distilled water for three times before being mixed with 50 ml isopropyl alcohol to give a colloidal suspension for further use.

Example 4

In another typical reaction run, 14 g of process oil and 53.6 g of PIBSI (M.W 800) was taken in a 250 ml reaction flask to this added the portion of suspension prepared from example 3 followed by 2.13 g titanium tetra isopropoxide. The mixture was heated to reflux for 90 minutes triggering hydrolysis of titanium precursor. After hydrolysis, the mixture was transferred to rotavapor flask and the solvent was removed under vacuum stripping at 90° C. The final mixture was heated further to 140° C. under vacuum for another 45 minutes to give clear product containing metals in the concentration range Ti-0.5 Wt % and Zn-2.0 Wt % and confirmed by ICP-AES. The product could readily be mixed in any mineral oil (Group I/II/II/IV) of lubricating viscosity.

Example 5

The product obtained from Example 4 was diluted with Gr II base oil to get ppm (parts per million) level of Ti—Zn concentration in final dispersion blends which were evaluated for anti-wear performance in four ball tester (Falex wear test machine) at 348K; 15 kg weight load (ASTM D4172). The tests were repeated two times (results with best precision were considered) and WSD results are summarized for neat base oil and blends in the below Table. The antiwear performance of the blends containing metal nanoparticles is comparable with the ZDDP containing blend.

| Dispersant (Wt %) | Metal Concentration (ppm) | | WSD (mm) |
| --- | --- | --- | --- |
|  | Ti (TiO$_2$) | Zn (ZnO) |  |
| 0 | 0 | 0 | 0.65 |
| 1.55 | 0 | 0 | 0.70 |
| 1.55 | 116 (193) | 380 (472) | 0.35 |
| 1.55 | 98 (163) | 400 (496) | 0.35 |
| 1.55 | 100 (168) | 390% (480) | 0.34 |
| 1.55 | 0 | 500# (634) | 0.35 |

ZDDP blend
%result of example 2

Although in the current invention nano zinc oxide & nano titania combination gives equivalent performance to ZDDP, however effect of Zn in sulfated ash contribution may be significantly reduced by exchanging Zinc Oxide partially with Titania, which is more greener.

The invention claimed is:

1. A process for in situ synthesis of dispersion of ZnO and TiO$_2$ nanoparticles in an oil medium, wherein the process comprises:
   (a) providing layered basic zinc hydroxide (LBZ) in an oil medium, containing a dispersant,
   (b) providing a titanium precursor in the oil medium to obtain a mixture,
   (c) hydrolyzing the mixture to obtain a suspension, and
   (d) decomposing the suspension to obtain a dispersion of mixture of ZnO and TiO$_2$ nanoparticles.

2. The process of claim 1, wherein the titanium precursor is a titanium tetra alkoxide precursor having formula Ti(OR)$_4$, wherein R is C1 to C4 alkyl group and the titanium tetra alkoxide precursors is selected from the group comprising of titanium tetra isopropoxide, titanium tetrabutoxide, titanium tetra ethoxide, and titanium tetra methoxide.

3. The process of claim 1, wherein the hydrolysis is achieved by the water existing in the form of hydrate within LBZ and the hydrolysis of mixture comprises refluxing the mixture of step (b) to hydrolyze titanium precursor to obtain a colloidal suspension containing titanium hydrous oxide in oil containing LBZ and dispersant.

4. The process of claim 1, wherein the decomposition comprises heating to 120-150° C. to obtain a dispersion of mixture of ZnO and TiO$_2$ nanoparticles, along with dispersant and residual anions.

5. The process of claim 1, wherein the in situ prepared nanoparticles of ZnO and TiO$_2$ are stabilized by dispersant in the oil medium, wherein the dispersant is ashless dispersant.

6. The process of claim 1, wherein the dispersant is present in the concentration range of 50-75 wt % or 50-65 wt % and the dispersant is oil soluble and free from phosphorus and sulfur.

7. The process of claim 4, wherein the dispersant is nitrogen substituted long chain alkenyl succinimide dispersant and selected from the group consisting of Polyisobutylene Succinimides (PIBSI), oil soluble fatty acid, sorbitan ester, and oil soluble carboxylic acids.

8. The process of claim 1, wherein step (a) comprises dispersing LBZ in a C1-C3 alcohol and adding to oil medium containing 40-60% of dispersant.

9. The process of claim 1, wherein providing a titanium precursor in said oil medium to obtain a mixture comprises stirring the mixture of step (a) continuously at 200-1500 RPM and adding stoichiometric amount of titanium tetra alkoxide precursor resulting Ti content of 3% by weight.

10. The process of claim 1, wherein the step (c) comprises:
   (i) hydrolyzing the titanium tetra alkoxides precursor by the water molecules of layered basic zinc hydroxide (LBZ) in oil medium comprising dispersant to give a colloidal suspension comprising titanium hydrous oxide in oil containing LBZ and dispersant; and
   (ii) evacuating the colloidal suspension of step (i) and followed by heating to 120-150° C. for 45 to 90 minutes to trigger the LBZ decomposition to ZnO and TiO$_2$ formation from titanium hydrous oxides to give a clear dispersion of ZnO nanoparticles in the oil medium along with nanoparticles of TiO$_2$, dispersant and residual anions.

11. The process of claim 6, wherein the nanoparticles of TiO$_2$ is prepared by the presence of 2 moles of H$_2$O within LBZ and ZnO nanoparticles is prepared by the decomposition of LBZ within the oil medium containing stabilizing agents and nano TiO$_2$.

12. The process of claim 6, wherein in the oil medium the nanoparticles of TiO$_2$ and ZnO are stabilized by dispersant in the concentration range in weight percent 50-75% or 50-65%, wherein dispersant is ashless dispersant.

13. The process of claim 7, wherein the ashless dispersant is oil soluble compounds containing polymeric hydrocarbon structure and polar functional groups that stabilize nanoparticles.

14. The process of claim 7, wherein the ashless dispersant is nitrogen substituted long chain alkenyl succinimides dispersant and selected from the group consisting of Polyisobutylene Succinimides (PIBSI), oil soluble fatty acid, sorbitan ester or oil soluble carboxylic acids.

15. The process of claim 6, wherein in step (i) the LBZ is dispersed in a C1-C3 alcohol and added to oil containing 40-60 wt % of dispersant before adding the titanium tetra alkoxide precursor to obtain a mixture and then the mixture is refluxed and during refluxing period the moles of water molecule hydrolyze titanium tetra alkoxide to give a colloidal suspension containing titanium hydrous oxide in oil containing LBZ and dispersant.

16. The process of claim 6, wherein the oil is selected from the group comprising of base oil, process oil, mineral lubricating oils, solvent-treated or acid-treated mineral lubricating oils of the paraffinic, naphthenic or mixed paraffinic-naphthenic types, polyalphaolefins (PAOs) derived from monomers having from 4 to 30 carbon atoms having a viscosity in the range from 1.5 to 150 mm²/s (cSt) at 100° C., esters of dicarboxylic acids with a variety of alcohols, or a mixture thereof.

17. The process of claim 6, wherein LBZ having formula $Zn_5(OH)_8(X)_2.2H_2O$ and X is anions and selected from a group comprising of Cl, $NO_3$, Br, I, and $CH_3COO^-$.

18. The process of claim 6, wherein the layered base zinc (LBZ) is prepared by the process comprising:
 (a) dissolving a Zinc salt comprising of zinc acetate dihydrate in an alcoholic solvent and heating to 90-120° C. for 40 minutes to 24 hours to obtain a suspension;
 (b) centrifuging the suspension as obtained in step (a) and washing with deionized water to precipitate layered base zinc (LBZ) having 2 moles of water in the form of hydrate.

* * * * *